United States Patent
Schwarz

(10) Patent No.: US 12,307,590 B2
(45) Date of Patent: May 20, 2025

(54) METHOD FOR HEAD IMAGE RECORDING AND CORRESPONDING MOBILE DEVICE

(71) Applicant: Carl Zeiss Vision International GmbH, Aalen (DE)

(72) Inventor: Oliver Schwarz, Ellwangen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/793,827

(22) Filed: Aug. 4, 2024

(65) Prior Publication Data

US 2024/0394971 A1   Nov. 28, 2024

Related U.S. Application Data

(63) Continuation of application No. PCT/EP2023/053505, filed on Feb. 13, 2023.

(30) Foreign Application Priority Data

Feb. 14, 2022 (EP) .................... 22156624

(51) Int. Cl.
*G06T 15/00* (2011.01)
*G06T 7/60* (2017.01)
(Continued)

(52) U.S. Cl.
CPC .............. *G06T 17/00* (2013.01); *G06T 7/60* (2013.01); *G06V 40/171* (2022.01); *G06V 40/193* (2022.01)

(58) Field of Classification Search
CPC ...... G06F 21/32; G06V 20/64; G06V 40/171; G06V 10/82; G06V 10/761; G06V 40/172; G06V 10/454
(Continued)

(56) References Cited

U.S. PATENT DOCUMENTS 7,016,824 B2   3/2006   Waupotitsch et al.
9,401,020 B1 *  7/2016   Li ................. G06V 20/647
(Continued)

FOREIGN PATENT DOCUMENTS

CN   104487886 A   4/2015
CN   106461982 A   2/2017
(Continued)

OTHER PUBLICATIONS

Xiao S, Feng J, Xing J, Lai H, Yan S, Kassim A. Robust facial landmark detection via recurrent attentive-refinement networks. In Computer Vision—ECCV 2016: 14th European Conference, Amsterdam, The Netherlands, Oct. 11-14, 2016, Proceedings, Part I 14 2016 (pp. 57-72). Springer International Publishing.*

(Continued)

*Primary Examiner* — Phu K Nguyen
(74) *Attorney, Agent, or Firm* — Tautz & Schuhmacher LLC; Georg Hasselmann

(57) ABSTRACT

A method of head image capturing is provided, which includes: capturing, with a mobile device, a first image of at least an eye portion of a head of a person, and capturing second images of the head with the mobile device while the head is turning in a first direction relative to the mobile device. The method entails searching for predefined landmarks in each of the second images, and stopping capturing the second images in response to identifying at least a predefined subset of the predefined landmarks in a second image of the plurality of second images. A corresponding mobile device is also provided.

24 Claims, 6 Drawing Sheets

(51) Int. Cl.
  *G06T 17/00*  (2006.01)
  *G06V 40/16*  (2022.01)
  *G06V 40/18*  (2022.01)
(58) Field of Classification Search
  USPC ........................................................ 345/418
  See application file for complete search history.

(56) References Cited

U.S. PATENT DOCUMENTS

| | | | |
|---|---|---|---|
| 9,508,197 | B2 | 11/2016 | Quinn et al. |
| 10,001,663 | B2 | 6/2018 | Bonnin et al. |
| 10,157,477 | B2 | 12/2018 | Chen |
| 10,268,911 | B1 | 4/2019 | Wu |
| 10,441,168 | B2 | 10/2019 | Nieuwenhuis |
| 10,755,438 | B2 | 8/2020 | Chen |
| 10,942,375 | B2 | 3/2021 | Alvarez Diez et al. |
| 11,215,845 | B2 | 1/2022 | Schwarz et al. |
| 11,470,260 | B1 | 10/2022 | Thorn |
| 12,126,937 | B2 * | 10/2024 | Strasman ............... G06N 3/045 |
| 2015/0049306 | A1 | 2/2015 | Haddadi et al. |
| 2015/0123967 | A1 | 5/2015 | Quinn et al. |
| 2015/0198822 | A1 | 7/2015 | Divo et al. |
| 2017/0090220 | A1 | 3/2017 | Bonnin et al. |
| 2017/0115513 | A1 | 4/2017 | Baranton et al. |
| 2018/0122123 | A1 | 5/2018 | Won et al. |
| 2018/0214022 | A1 | 8/2018 | Nieuwenhuis et al. |
| 2019/0180084 | A1 | 6/2019 | Bouaziz et al. |
| 2019/0213773 | A1 * | 7/2019 | Lee ....................... H04L 67/535 |
| 2020/0018994 | A1 | 1/2020 | Nieuwenhuis |
| 2020/0018995 | A1 | 1/2020 | Nieuwenhuis et al. |
| 2020/0057316 | A1 | 2/2020 | Nieuwenhuis |
| 2020/0103675 | A1 | 4/2020 | Schwarz et al. |
| 2020/0125835 | A1 | 4/2020 | Bouaziz et al. |
| 2020/0142224 | A1 | 5/2020 | Schwarz et al. |
| 2020/0218095 | A1 | 7/2020 | Gamperling et al. |
| 2020/0233239 | A1 | 7/2020 | Schwarz et al. |
| 2021/0174067 | A1 | 6/2021 | Chang et al. |
| 2021/0304516 | A1 * | 9/2021 | Lee ....................... G06V 10/54 |
| 2021/0382330 | A1 | 12/2021 | Gamperling et al. |
| 2022/0229312 | A1 | 7/2022 | Escalier et al. |
| 2022/0335567 | A1 | 10/2022 | D'Amico et al. |
| 2023/0077539 | A1 | 3/2023 | Gromotka et al. |
| 2023/0267687 | A1 * | 8/2023 | Papandreou ............... G06T 7/75 345/419 |
| 2024/0104180 | A1 * | 3/2024 | S ............................ G06F 21/32 |

FOREIGN PATENT DOCUMENTS

| | | |
|---|---|---|
| CN | 106461983 A | 2/2017 |
| CN | 110569829 A | 12/2019 |
| CN | 113692551 A | 11/2021 |
| CN | 114390219 A | 4/2022 |
| EP | 3354190 A1 | 8/2018 |
| EP | 3363346 B1 | 8/2018 |
| EP | 3410178 A1 | 12/2018 |
| EP | 3422087 A1 | 1/2019 |
| EP | 3425446 A1 | 1/2019 |
| EP | 3425447 A1 | 1/2019 |
| EP | 3574370 B1 | 6/2020 |
| EP | 3631570 B1 | 10/2020 |
| EP | 3649505 B1 | 11/2020 |
| EP | 3913424 A1 | 11/2021 |
| WO | 2018138258 A1 | 8/2018 |
| WO | 2019008087 A1 | 1/2019 |
| WO | 2019164502 A1 | 8/2019 |
| WO | 2020178167 A1 | 9/2020 |

OTHER PUBLICATIONS

Lu X, Jain AK. Automatic feature extraction for multiview 3D face recognition. In7th International Conference on Automatic Face and Gesture Recognition (FGR06) Apr. 10, 2006 (pp. 585-590). IEEE.*

Wu Y, Ji Q. Facial landmark detection: A literature survey. International Journal of Computer Vision. Feb. 15, 2019;127(2):115-42.*

Tanskanen P, Kolev K, Meier L, Camposeco F, Saurer O, Pollefeys M. Live metric 3D reconstruction on mobile phones. InProceedings of the IEEE International Conference on Computer Vision 2013 (pp. 65-72).*

Rublee E, Rabaud V, Konolige K, Bradski G. Orb: An efficient alternative to SIFT or SURF. In2011 International conference on computer vision Nov. 6, 2011 (pp. 2564-2571). Ieee.*

Lee KS, Wong KH, Or SH, Fung YF. 3D face modeling from perspective-views and contour-based generic-model. Real-Time Imaging. Apr. 1, 2001;7(2):173-82.*

Wu et al., "Automatic Eyeglasses Removal from Face Images," IEEE transactions on pattern analysis and machine intelligence, pp. 322 to 336, vol. 26, No. 3, Mar. 2004.

Hartley et al., "Multiple View Geometry in computer vision," section 1.2 "Camera projections," pp. 6 to 10, 2004.

Zhu et al., "Face detection, pose estimation and landmark localization in the wild," IEEE Conference on Computer Vision and Pattern Recognition, pp. 2879 to 2886, Jun. 2012.

Perakis et al., "3D facial landmark detection under large yaw and expression variations," IEEE transactions on pattern analysis and machine intelligence, vol. 35, No. 7, pp. 1552 to 1564, Jul. 2013.

Burgos-Artizzu et al., "Robust face landmark estimation under occlusion," IEEE International Conference on Computer Vision, pp. 1513 to 1520, Dec. 2013.

Tanskanen et al., "Life metric 3D reconstruction on mobile phones," Proceedings of the IEEE International Conference on Computer Vision, pp. 65 to 72, Dec. 2013.

Kazemi et al., "One millisecond face alignment with an ensemble of regression trees," IEEE conference on Computer Vision and Pattern Recognition, pp. 1867 to 1874, Jun. 2014.

Kolev, et al., "Turning mobile phones into 3D scanners," Proceedings of the IEEE Conference on Computer Vision and Pattern Recognition, pp. 1 to 8, Sep. 2014.

Muratov et al., "3D Capture: 3D Reconstruction for a Smartphone," IEEE Conference on Computer Vision and Pattern Recognition Workshops, pp. 75 to 82, Jun. 2016.

Kowalski et al., "Deep alignment network: A convolutional neural network for robust face alignment," In Proceedings of the IEEE conference on computer vision and pattern recognition workshops, pp. 88 to 97, Jul. 2017.

Amato et al., "A Comparison of Face Verification with Facial Landmarks and Deep Features," Conference on Advances in Multimedia, pp. 1 to 6, Apr. 2018.

Wu et al., "Facial landmark detection with tweaked convolutional neural networks," IEEE transactions on pattern analysis and machine intelligence, vol. 40, No. 12, pp. 3067-3074, Dec. 2018.

Guo et al., "PFLD: A practical facial landmark detector," arXiv preprint, pp. 1 to 11, Feb. 2019.

Wu et al., "Facial landmark detection: A literature survey," International Journal of Computer Vision, vol. 127, No. 2, pp. 115 to 142, Feb. 2019.

International Standard "Robots and robotic devices," (ISO 8373:2012) German and English version, Mar. 2012.

Industrial Norm "Ophthalmic optics—Spectacle lenses—Vocabulary (ISO 13666:2012)," German and English version EN ISO 13666:2012, Oct. 2013.

European Search Report issued in EP 22156624.3, to which this application claims priority, mailed Jul. 20, 2022.

International Search Report and Written Opinion issued in PCT/EP2023/053505, to which this application claims priority, mailed May 22, 2023.

International Preliminary Report on Patentability issued in PCT/EP2023/053505, to which this application claims priority, mailed Jan. 10, 2024.

Office Action by the Chinese Patent Office (CNIPO) issued in CN 202380021625.3, which is a counterpart hereof, mailed on Jan. 23, 2025, and English-language machine translation thereof.

* cited by examiner

METHOD FOR HEAD IMAGE RECORDING AND CORRESPONDING MOBILE DEVICE

CROSS REFERENCE TO RELATED APPLICATIONS

This application is a continuation application of international patent application PCT/EP2023/053505, filed on Feb. 13, 2023 and designating the U.S., which claims priority to European patent application EP 22 156 624.3, filed on Feb. 14, 2022, both of which are hereby incorporated by reference in their entireties.

TECHNICAL FIELD

The present application relates to methods for recording head images using a mobile device, which then may be used for purposes of head model generation, determination of centration parameters, or both. Furthermore, the present application relates to corresponding devices.

BACKGROUND 3D models of a head of a person, shortly referred to as head models herein, may be used to represent the head of the person as a so-called avatar in a variety of applications. One example application is a virtual fitting and try-on of spectacle frames, as for example described in WO 2019/008087 A1. For such applications, it is desirable that the head model used matches the actual head of the person, to give a correct visual impression of how the spectacle frame looks on the person.

Another application is the determination of centration parameters. Centration parameters are parameters which are required to fit lenses correctly in a spectacle frame (so-called centration process) such that the lenses are worn in a correct position relative to the eyes of the person. Examples for such centration parameters include the pupillary distance, the centration distance, the vertex distance, the fitting point positions or the as worn pantoscopic angle. These and other centration parameters are defined in section 5 of the DIN EN ISO13666-2012 and are used in the sense defined in this standard herein.

Such centration parameters are nowadays in many cases determined automatically or semi-automatically using corresponding systems. An example for a centration system which is also capable of generating a head model is the Zeiss VISUFIT 1000 centration system.

For determining centration parameters, the VISUFIT 1000 system uses an approach described in EP 3 363 346 B1. Here, an arrangement of nine cameras having a fixed spatial relationship with each other, i.e., arranged in fixed positions within the device, are used, such that the positions and orientations of the cameras are known in advance. The combination of position and orientation is also referred to as pose herein, as defined in DIN EN-FR ISO 8373-2012-03. In this way, as the relative poses of the camera are known, the head model may be generated based on techniques similar to triangulation. For centration, with the camera arrangement described front and side images are recorded. These images are used to detect the pupil center in the front image and the cornea apex in the side image, and an adapted triangulation approach is used to calculate the 3D position of the cornea apex. As further described in U.S. Pat. No. 10,942,375 B2, an illumination unit may be used ensuring that the eyes are well-lit and visible from all viewing angles. US 2020/0057316 A1 discloses a similar approach with a slightly different representation of input data, which also encompasses the 3D model of a spectacle frame as it is the case for so-called virtual centration, where the person does not wear an actual spectacle frame, but a spectacle frame is virtually fitted and adapted to the person. While these approaches work well, they require a specific device with a stationary camera arrangement, which may for example be provided at an optician or doctor, but is hardly feasible for private use of persons.

With the increasing capabilities of mobile devices like smartphones and tablet PCs, both with respect to processing power and with respect to image capturing abilities, various approaches have been made for generating head models and performing centration using such mobile devices. Generally, in such approaches the head of the person or at least an eye portion thereof, i.e., a part including the eyes, is captured from different directions using a camera of the mobile device. The camera may include a depth sensor, such that so called RGBD (red, green, blue, depth) images are provided. EP 3 913 424 A1 discloses a method for determining some centration parameters using a mobile device, where the head is captured from different positions of a mobile device and an acceleration sensor is used to measure the acceleration of the mobile device while moving it between positions.

Compared to a stationary camera arrangement, two general issues exist when using a mobile device. On the one hand, the relative camera poses for the images captured are not known a priori. Several approaches exist for resolving this problem.

For example, Tanskanen, Petri, et al., "Life metric 3D reconstruction on mobile phones," Proceedings of the IEEE International Conference on Computer Vision, 2013, discloses a life metric 3D reconstruction for example of statues in a museum, where a pose estimation of the mobile phone is performed using inertial tracking by an accelerometer and/or gyroscope provided in the mobile phone.

Kolev, Kalin, et al., "Turning mobile phones into 3D scanners," Proceedings of the IEEE Conference on Computer Vision and Pattern Recognition, 2014, uses a camera motion tracking system to provide camera poses.

Muratov, Oleg, et al., "3D Capture: 3D Reconstruction for a Smartphone" also uses an inertial measurement unit for tracking camera poses.

These approaches rely on the accuracy of acceleration sensors or similar elements to provide camera poses, from which 3D models can be calculated.

In another approach, WO 2019/164502 A1 discloses generating head models using a smartphone for capturing images using 3D Mesh representations. In US 2020/0 125 835 A1 a three dimensional model of a head is generated from captured images or a video. A machine learning network is used to track poses and expressions and to refine the model.

A second issue when using a mobile device for capturing images is to ensure that the captured images indeed include the necessary parts of the head from desired directions, for example front and side images. In contrast thereto, with the stationary camera arrangement described above the camera arrangement itself ensures that both front images and side images of the head are captured. The present application is mainly concerned with this second issue.

U.S. Pat. No. 10,755,438 U1 and U.S. Pat. No. 10,157,477 B1 disclose a head model capture process where the person is instructed to turn his or her head in front of the camera of a mobile device until a certain angle is determined automatically by software running on the mobile device. Determining the angle of rotation is achieved by matching a 3D mesh model obtained from each of the head rotation poses to an initial mesh model of an initial pose and calculating a 3D transformation which maps the mesh of the initial pose to the mesh of each following poses. From this transformation the angle of rotation can be calculated, and upon exceeding a threshold, the mobile device, programmed accordingly, gives corresponding instructions to the person via the display of the mobile device or via outputting audio information. The rotation may be performed to the left side and the right side.

With this approach, a continuous matching of the 3D meshes is required during the capturing process. This may be computationally intensive, such that the approach may be limited to mobile devices with very high processing powers. Furthermore, with the variety of heads, hairstyles etc. this approach does not necessarily ensure that all head features necessary for centration are reliably captured, making an accurate centration difficult. Finally, this approach is not suitable for real frame centration, when the person already wears a real spectacle frame and centration parameters for this real spectacle frame are to be determined. In particular in this case in some images the cornea may be occluded by the spectacle frame, which depends on the type of spectacle frame the person is wearing, in particular on the base curve, wrap angle or both of the spectacle frame. Therefore, also in this case using a certain angle threshold for image capture may lead to the images captured not containing all information necessary for centration.

SUMMARY

The present disclosure addresses this problem, i.e., the problem of image capture and ensuring that relevant information is present in the captured images.

According to a first aspect, a method for head image capturing is provided, comprising:
  providing to a mobile device a first image of at least an eye portion of a head,
  providing to the mobile device a plurality of second images of the head from a plurality of directions,
  searching, with the mobile device, for predefined landmarks in each of the second images, and
  stopping providing to the mobile device the plurality of second images in response to identifying, with the mobile device, at least a predefined subset of the predefined landmarks in a second image of the plurality of second images.

The providing of the first and second images to the mobile device may comprise providing, e.g. capturing, the first and second images by a camera of the mobile device. In other exemplary embodiments, an external camera may be used, which may be linked to the mobile device in a wireless manner (e.g. Bluetooth or WLAN) or wire-based manner (e.g. USB, LAN, etc.). The capturing in this and following aspects may be performed by the person to whom the head belongs herself or himself, but may also be performed by another person.

According to a second aspect, a method for head image capturing is provided, comprising: capturing, with a mobile device, a first image of at least an eye portion of a head of a person, and capturing a plurality of second images of the head with the mobile device while the head is turning in a first direction relative to the mobile device. The method is characterized by searching, with the mobile device, for predefined landmarks in each of the second images, and stopping, with the mobile device, capturing the second images in response to identifying at least a predefined subset of the predefined landmarks in a second image of the plurality of second images.

This second aspect may alternatively be implemented as a method for head image capturing, comprising:
  capturing, with a mobile device, a first image of at least an eye portion of a head of a person, and turning the head in a first direction relative to the mobile device while capturing a plurality of second images of the head with the mobile device. The method in this case is characterized by searching, with the mobile device, for predefined landmarks in each of the second images, and stopping, with the mobile device, capturing the second images in response to identifying at least a predefined subset of the predefined landmarks in a second image of the plurality of second images.

Therefore, both for the first and second aspect, in contrast to the above discussed conventional approach of U.S. Pat. No. 10,755,438 U1 and U.S. Pat. No. 10,157,477 B1, the capturing of second images is not stopped when a predefined turning angle is reached, but is stopped based on the presence of landmarks in the captured second images. This ensures that landmarks needed for a specific purpose like centration are actually visible in the second images. Furthermore, detecting landmarks is possible with less computing power than the generation of complete meshes as in the related art.

Terms used above for defining the method and further features will now be explained. The explanations apply both to the first aspect and to the second aspect.

A mobile device is a device intended to be carried by a person. Typically, mobile devices have a weight smaller than 1 kg. Mobile devices as used herein include at least a processor, which is used for performing for example the searching and stopping mentioned above as well as controlling the mobile device overall, and an image capturing device for capturing the first and second images. Typical examples for such mobile devices include smart phones and tablet PCs.

The term image may refer to a 2D color image, a 2D black-and-white image, a depth image captured with a depth sensor like a time-of-flight (TOF) sensor, or combinations thereof. In an exemplary embodiment, the image is a combination of a 2D color image and a depth image, also referred to as RGBD image. Some modern mobile devices like smartphones or tablet PCs are already equipped with such image capturing devices which include both a digital RGB camera and a depth sensor.

"At least an eye portion" means that in the first image, at least the eyes of the person are visible. The first image typically is a front image, where the head is captured from the front. The front image refers to an image captured from the front and shows at least the eyes of the person.

Turning the head relative to the mobile device may either be performed by holding the mobile device stationary and turning the head, or holding the head stationary and moving the mobile device around the head. Both alternatives are included in the term "turning the head relative to the mobile device." The first direction may be a direction to the left or a direction to the right, such that the turning is about a vertical direction of the head. In other exemplary embodiments, the turning may be around a horizontal direction of the head.

Landmarks are specific point or areas on the head. Generally speaking, such landmarks may for example include the tip of the nose, points on the nose bridge, corners of the mouth or of the eye, pupils, the cornea, or points or features of the ear. As will be explained below, in particular exemplary embodiments, landmarks on the eye like cornea and pupil as well as landmarks on the ear may be used. Various landmarks related to the ear include, but not limited thereto, the lobule, the antitragus, the tragus, the root of the helix and the highest point of the helix_(helix superior). These may be used as landmark points.

The searching for the predefined landmarks and identifying the same may be done by various conventional means. For example, a trained machine learning logic like a neural network may be used to search for and determine the landmark points. In this case, for training, a number of images from different positions and for a plurality of different heads are used as training data, where the predefined landmarks may be manually annotated. After training then the trained machine learning logic determines the landmark points. Details may be found for example in Y. Wu et al., "Facial landmark detection with tweaked convolutional neural networks," IEEE transactions on pattern analysis and machine intelligence, 40(12), 3067-3074, 2017; in P. Perakis et al., "3D facial landmark detection under large yaw and expression variations," IEEE transactions on pattern analysis and machine intelligence, 35(7), 1552-1564, 2012; or in Y. Wu et al., "Facial landmark detection: A literature survey." International Journal of Computer Vision, 127(2), 115-142 (2018).

Another algorithm using convolutional neural networks to predict the location of facial landmarks in an image is described in X. Guo et al., PFLD: "A practical: facial landmark detector," arXiv preprint, 2019. arXiv: 1902.10859. Another approach based on regression trees is disclosed in V. Kazemi et al., "One millisecond face alignment with an ensemble of regression trees," IEEE conference on Computer Vision and Pattern Recognition (CVPR), 1867-1874 (2014). This approach is also implemented in the software library "dlib."

Another approach is described in X. Zhu, et al., "Face detection, pose estimation and landmark localization in the wild," IEEE Conference on Computer Vision and Pattern Recognition, 2879-2886 (2012). A further approach using e.g. deep learning and convolutional neural networks, is discussed in G. Amato et al., "A Comparison of Face Verification with Facial Landmarks and Deep Features," conference paper of April 2018 MMEDIA 2018, The Tenth International Conference on Advances in Multimedia, Athens, Greece. Another approach using trained linear regressors is disclosed in X. P. Burgos-Artizzu et al., "Robust face landmark estimation under occlusion," 2013 IEEE International Conference on Computer Vision. Still other approaches do not use a trained machine learning logic, but conventional image analysis to detect landmark points, although this generally requires more effort than the more recent approaches using machine learning.

Therefore, various possibilities for searching for and identifying landmarks are known in the art.

In some cases, a plurality of landmark points on the outline, e.g., of the ear or another face part where landmarks are to be searched for may be required for a feature detector using a statistical model or a neural network. An example of a corresponding face alignment method using a neural network is described in Kowalski, M., Naruniec, J. and Trzcinski, T., 2017, "Deep alignment network: A convolutional neural network for robust face alignment," In Proceedings of the IEEE conference on computer vision and pattern recognition workshops (pp. 88-97). An example of a face alignment method building on a statistical model is described here: Kazemi, Vahid & Sullivan, Josephine (2014), "One Millisecond Face Alignment with an Ensemble of Regression Trees," 10.13140/2.1.1212.2243. Most of the commonly known methods are not explicitly trained on datasets containing feature points of the ears and/or feature points of the eyes. Therefore, in such exemplary embodiments a fresh training using images or models manually annotated with the landmarks used herein, in particular landmarks related to the ears and eyes may be conducted in order to use these approaches for the purpose described herein, i.e., searching for and identifying corresponding landmarks.

An example for a landmark which is not a point, but a curve, is the front contour of the cornea, which may be represented as an arc with a preset radius. The radius may be determined starting from an average of 8 millimeter radius for human cornea curvature and may be translated to a pixel radius which may be calculated based on $R\_pixels = R\_cornea\_real / dist\_eye * f\_pixel$. R_pixel is the radius of the cornea in pixels in a particular image, R_cornea_real is the approximate real radius of the cornea, for example 8 millimeters, dist_eye is the distance of the eye from the optical center of the camera, as for example determined with a depth sensor of the camera mentioned above, and f_pixel is the focal length of the camera expressed in pixels, which is part of the camera calibration, i.e., known for a particular camera. The conversion between a real object and the dimensions of the objects in pixels in the image based on camera calibration data is per se known, for calibration 3D reconstruction see camera and example docsopencv.org/2.4/modules/calib3d/doc/camera_calibration_and_3d_reconstruction.html Richard Hartley and Andrew Zisserman, "Multiple View Geometry in computer vision," Cambridge University Press, 2004, section 1.2 "Camera projections."

"Predefined subset" means that while a search for all the predefined landmarks is performed, only some of them (the subset) need to be identified for the stopping. For example, as will be described later, a plurality of ear points may be searched for, and the capturing of the image stops if most of these points have been identified. More than one predefined subset may be used.

The above capturing, searching and stopping is performed by the mobile device itself, while the positioning of the head relative to the mobile device, including the turning the head in a first direction relative to the mobile device, is performed either by the person or by an additional person holding the mobile device. For brevity's sake, in the following explanation it will be assumed that the person himself or herself performs this step and similar steps described below, but it is to be understood that also another person may at least help the person to perform the respective steps.

To facilitate the performing of the respective steps like the turning by the person, the mobile device may output corresponding instructions. For example, instructions may be output as for audio instructions in verbose form or by certain signal sounds, and/or may be performed by displaying visual instructions or cues on a display of the mobile device. Conventional mobile devices like smartphones or tablet PCs usually include loudspeakers and a display usable for outputting such information.

For instance, in an exemplary embodiment the method may further comprise outputting instructions to stop moving the head in the first direction relative to the mobile device in response to identifying at least the predefined subset, i.e., when stopping the capturing. In this way, the person is informed that the turning may be stopped, and capturing of the second image is complete.

The predefined subset is selected such that when the predefined subset is identified in a second image, this means that for the purpose the images are used later on an appropriate second image has been captured. For example, the predefined subset may indicate that the image is a side image, where the predefined subset is visible.

After the stopping of the turning, the method may further comprise capturing third images while turning the head in a second direction relative to the mobile device opposite the first direction, corresponding to turning the head in a second direction relative to the mobile device opposite the first direction while capturing third images of the head with the mobile device, searching for further predefined landmark points in each of the third images, and stopping capturing the third images in response to identifying at least a further predefined subset of the further predefined landmark points in a third image of the plurality of third images.

In this way, for example both sides of a head may be captured, if the first direction for example corresponds to a direction of one of the left or right and the second direction corresponds to the opposite of the first direction, i.e., the other one of left or right. Otherwise, the mechanism here is the same as explained above for the first direction. The further predefined landmark points may be essentially the same as the landmark points as defined above, but for the other side of the head, and likewise the further predefined subset may be essentially the same as the predefined subset, but for the other side of the head. In this way, for example a side image from a first side of the head may be captured in the second images, and a side image from the other side of the head may be captured in the third images.

Also here, instructions to stop turning the head in the second direction may be output in response to identifying the further predefined subset.

In other exemplary embodiments, capturing the third images may be omitted. For example, as an alternative, only images of only one side of the head may be captured, and for the other side of the head a symmetry may be assumed as an approximation. This is an example approximation, as human heads as a rule are not strictly symmetrical, but on the other hand speeds up the capturing process.

The first image may be a front image. This means for example that in the first image both eyes of the person are captured. The predefined subset and, if used, the further predefined subset may then be used to ensure the capturing of side images, as mentioned above.

To facilitate the capturing of the front image, corresponding instructions may be output to the person.

For example, generally during the image capturing process a so-called front camera (a camera on the same side as the display of the mobile device) may be used. The image captured by the front camera may be shown on the display of the mobile device in a mirror-like function. For capturing the front image, then a schematic face outline may be displayed overlying the image captured by the front camera, and the person may be instructed to hold the mobile device in a way that the face shown in the image is within the face outline. Additionally, yet further landmark points may be detected, like points of both eyes, the mouth and the nose, to verify that a front image is captured.

The predefined landmark points, and if used the further predefined landmark points may include at least one landmark selected from the group consisting of a pupil, a cornea apex, a cornea outline and a point or feature at an ear. Typically, both pupil and cornea apex or cornea outline may be used, and a plurality of points at the cars or other features at the ears may be used. By using the pupil and the cornea apex or cornea outline, it may be ensured that features necessary for centration parameter determination are visible at least in the second image or third image where these landmark points are identified. By using points or features of the ear, side view maybe ensured. Furthermore, for some virtual try-on processes, also the cars are used further as explained below.

For example, the predefined subset or further predefined subset may then include a greater part of ear points or features from the predefined landmark points, ensuring that at least the greatest part of the ear is visible.

Once the first image, the second images and optionally the third images have been captured, the images are processed in exemplary embodiments. This image processing may be performed by the mobile device itself that may also be performed at another device. For example, the captured images may be sent to another device via a network like the internet, and optionally also results may be then received at the mobile device from the other device. For example, the other device may be a device with a higher computer power. For example, as no meshes need to be calculated during image capture, the image capturing itself may be performed with lower computing power compared to the above discussed prior approach using meshes, and then the images may be transferred to a device having a higher computing power, if the computing power of the mobile device is insufficient.

In some exemplary embodiments, this processing of the captured images may include determining at least one geometrical parameter based on the images. The geometrical parameter may for example be a distance between landmarks on the head, for example the pupillary distance, a width of the head etc. In other exemplary embodiments, the geometrical parameter may include a distance between landmark of the head and a landmark of a spectacle frame, for example the distance between the cornea and a position of glasses of the spectacle frame. Involving the spectacle frame is described further below in more detail. The at least one geometrical parameter may be a centration parameter. In this way various geometrical parameters may be determined, and the above captioned image capturing process may ensure that landmarks necessary for determining the at least one geometrical parameter are visible for example in the second images or optionally also in the third images above, or that the images are captured from a direction necessary for determining the geometrical parameter. In one exemplary embodiment, the image capturing process ensures that a side image is captured.

During the image capturing process the person may be instructed to look at a certain target. This target may be a certain part of the mobile device like the camera of the mobile device or a corner of the mobile device or may be a target displayed on a display of the mobile device. If an image of the person is displayed during image capture, the targets may also be the eyes of the person shown.

In particular, when the person holds the mobile device by himself or herself, the mobile device is comparatively close to the eyes of the customer, which causes the lines of sight of the two eyes during image acquisition to converge towards the target presented. In this case, to correct this convergence, a vergence correction may be applied. In the above cases, the location of a target relative to the camera is known, such that for vergence correction the 3D eye points may be transformed via one or more rotations around the center of rotation of the eye. The respective location of the center of location, for example with respect to the cornea apex which may be detected as a landmark as mentioned above, is known according to an atomical model of the eye. So the relative position of the eye points may be adapted such that it matches the location as if the person had focused on a fixation target at infinity, in a direction known as primary direction of gaze or zero viewing direction.

In other exemplary embodiments, the person may be instructed to look into infinity, essentially in the above-mentioned primary fixation direction, for example at a target in a wall, and another person may move the mobile device around the head. In such a case, no vergence correction is necessary.

In some exemplary embodiments, processing the images may include generating a head model or a model of at least the eye region based on the images. This may be performed in any conventional manner, for example as described in the documents cited in the background portion.

In this head model, landmarks in the above sense may be detected. One landmark necessary for some determination of centration parameters is the eye cornea apex position in 3 dimensions, which is referred to as 3D apex position in the following. One method to obtain this 3D apex position which is applicable is described in EP 3 363 346 B1 mentioned above. When using this approach, it is necessary to obtain a side image of the head of the person showing the cornea from the side. This may be ensured by the above approach based on the subset of predefined landmarks which have to be detected in the second image. Alternatively, the reconstructed 3D model of the head, and here the eye portion thereof may be used directly to determine the 3D apex position.

Since the human cornea is transparent and therefore in some approaches, for example which use a pattern projection and triangulation approach based on the images, the cornea may be appear flattened in the head model. This may be mitigated by heuristic approaches, for example applying an offset of about 3 millimeters to the area around the pupil center. In this case, when capturing the second or third images and in particular capturing a side image, the person may be instructed to focus on an arbitrary point far away so that the person has approximately the primary direction of gaze.

Therefore, different approaches may be used to determine the 3D apex position.

As mentioned above, some geometrical parameters, in particular centration parameters, may include distances between landmarks on the head and landmarks of a spectacle frame worn by a person. Generally, two approaches may be used for obtaining the positions of landmarks of a spectacle frame.

In a first approach, the method comprises virtually fitting a model of a spectacle frame to the head model. Such a virtual fitting is also referred to as virtual try-on sometimes and is described for example in EP 3 410 178 A1 or EP 3 425 447 A1. Based on landmarks on the fitted model of the spectacle frames and landmarks on the head model, geometrical parameters like centration parameters may be then determined. In EP 3 410 178 A1 a plurality of images of a head of a person is captured from different directions. Another virtual try-on approach is disclosed in EP 3 631 570 B1. In case of EP 3 649 505 B1, also a parametric frame model may be adapted to the head model generated.

In an alternative approach, the person, when the first, second and optionally third images are captured, wears a spectacle frame. This spectacle frame is then identified in the images, and geometrical parameters may be determined based on the identified spectacle frame. For example, in this case the head model mentioned above may include a model of the spectacle frame generated based on the images (first image, second images and optionally third images), and geometrical parameters like centration parameters may be determined. In another approach, a generic spectacle frame model may be fitted to the identified spectacle frame in the images, and centration parameters may be determined based on the fitted model as described for example in WO 2018/138258 A1. Other approaches for obtaining centration parameters for real frame spectacle frames as worn by the person may be based on the approaches disclosed in EP 3 363 346 B1 or EP 3 574 370 B1.

In case the first approach above, using a virtual a try-on, is to be used, but the person wears a spectacle frame, the mobile device may give an instruction to the person to take off the spectacle frame. In case the person needs comparatively strong corrective lenses, in such a case where the person does not wear a spectacle frame (or other visional aids like contact lenses), the above instructions to the person for carrying out the method may be given as precise audio instructions, as the person may be unable to recognize visual instructions on the display of the mobile device.

In another approach, when the person wears a spectacle frame, the spectacle frame may be virtually removed from the images and therefore omitted from the head model generated. Another use case for this function is the side-by-side comparison of a real spectacle frame worn by the person and virtual frames without the need to take several images to capture sequences. An automated removal may be achieved by training a machine-learned model such as a neuronal network to remove the frame from the image. As training material, real pairs of images of persons with or without a spectacle frame may be used. In addition or alternatively artificial training material may be generated using virtual try-on of spectacle frame and generating rendered image pairs, which has the advantage that the person will show the exact same facial expression in both images (with or without spectacle frame) which tends to produce less artefacts in training. Another approach for removal spectacle frames from images is disclosed in Wu Chenyu et al., "Automatic eyeglasses removal from face image," IEEE transactions on pattern analysis and machine intelligence, IEEE computer society, volume 26 no. 3, 2004, 322-366.

Centration parameters thus determined may then be transmitted to a lens manufacturer to manufacture lenses for the respective spectacle frame accordingly.

As already mentioned above during the image capturing process, the current image captured may be displayed on a display on a device, in a kind of mirror function. In other cases, when the mobile device is equipped accordingly and has sufficient computer power a mesh or other model of the head may be continuously displayed. For example, some modern smartphones or tablets are equipped with an RGB camera as mentioned above and have a corresponding library for generating 3D representations. For example, ARKit for IOS devices or ARCore in case of Android devices offer such a possibility. In this case, an image based on such a 3D representation (for example a so-called avatar) may be displayed instead of the mirrored image. Such approaches for example in case of some IOS devices may be placed on infrared pattern projection.

In another aspect of the disclosure, a corresponding mobile device, which includes at least a processor for implementing a method according to the second aspect, optionally (in case the mobile device captures the images) also for the first aspect, and a camera device for capturing images, is provided. The processor is configured to control the mobile device essentially to perform the methods described above, i.e., to control the camera for a corresponding display of the image capturing, to analyze the images to identify landmarks as explained above, and to stop image capturing accordingly. The mobile device may further include a display, a loudspeaker or any other input/output equipment to give corresponding instructions to the person for those steps of the method which depend on actions of the person, for example the turning of the head relative to the mobile device. It should be noted that based on the landmarks the mobile device may check if the person turns the head correctly for example based on visibilities of eye landmarks like pupil and ear landmarks changing in the images. To give an example, when the head is turned from a front image, one of the two eyes disappears when turning, and one of the ears becomes more and more visible. In case such changes of landmarks are not detected, an error message may be output. In other approaches no such error detection is performed, and when the user operates the device incorrectly (for example does not turn the head), undesired images are captured, and the result of the method like calculation of centration parameters would not be correct.

To compensate for the risk of incorrect centration parameters, in some exemplary embodiments a user interface of the mobile device may be configured to, e.g., be programmed to present a final check to the person or another person before the centration parameters are actually used for centration. Given the reconstructed 3D cornea apex points for the eyes in the head model, these 3D points can be projected back into one or several of the captured images so that the person or another person may check the correct positioning. The camera calibration data can be used to map the 3D points into the image's pixel as described in the above-cited publication of Richard Hartley and Andrew Zisserman. In a similar way the mobile device or also other device where data is transferred to may present a final check screen to the person or another person visualizing other landmarks and 3D points projected back into 2D images. Another method to present the centration parameters is the drawing of a technical sketch of the frame including the centration points and distances. The technical sketch may be an orthographic projection of the 3D model into a 2D plane and include the possibility to show this true to scale on the mobile device's display.

In case for example of smartphones or tablet PCs, a corresponding computer program (usually refer to as "app" in case of smartphones and tablet PCs) may be provided to program the mobile device accordingly to perform any of the methods above, e.g. to cause a processor of the mobile device to control the mobile device to perform the method. Such a computer program may be provided on a tangible storage medium like a harddisk, a CD, a DVD, a memory stick, a memory, e.g. a memory of the mobile device, or the like, or transmitted as a data carrier signal.

BRIEF DESCRIPTION OF THE DRAWINGS

Exemplary embodiments will now be described referring to the attached drawings.

DESCRIPTION OF EXEMPLARY EMBODIMENTS

Figure 1:
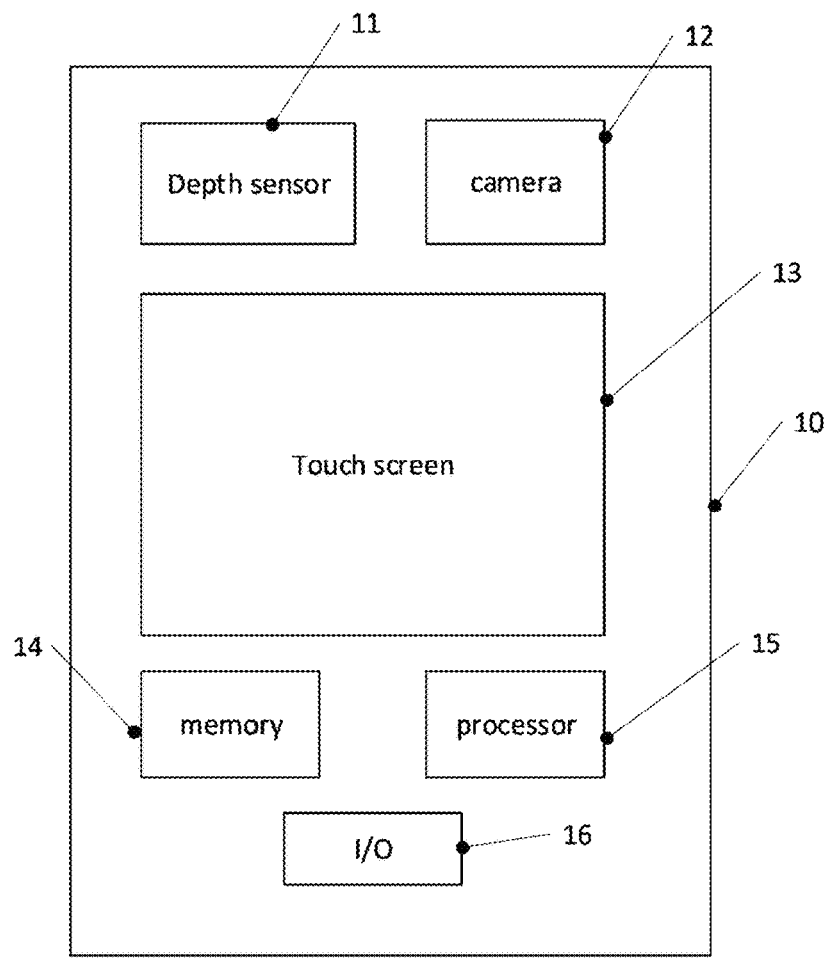
FIG. 1 is a block diagram of a device according to an exemplary embodiment.

In the following, exemplary embodiments related to the capturing of images, which may then be used to generate a 3D model of a head or part thereof, to determine centration parameters, using a mobile device like a smartphone or tablet PC will be described. FIG. 1 shows a block diagram of a device 10 usable in some exemplary embodiments. Device 10 may be a smartphone or a tablet PC but also may be a dedicated device. Device 10 is programmed accordingly to perform the methods as discussed herein.

Device 10 includes a camera 12 and a depth sensor 11. Depth sensor 11 and camera 12 form an RGBD camera as discussed above and are an example of a camera device. In other exemplary embodiments, the depth sensor 11 may be omitted. Furthermore, device 10 includes a touchscreen 13, a processor 15, memory 14 and input/output interfaces 16. Touchscreen 13 may serve to control device 10 and may also serve to output instructions to a person, as an example for a display, for example to output instructions to capture the images as discussed above and also explained below with respect to FIG. 2. Processor 15 executes instructions stored in memory 14 to implement methods as discussed above and below. Input/output interfaces 16 may provide communication to a network like the internet, for example to transmit captured images to a further device in case the further processing of the images is not performed in device 10, and optionally to also receive the result of such calculations, or also to transmit determined centration parameters to a lens manufacturer. Furthermore, input/output interfaces 16 may include further components for communicating with a user, for example like a loudspeaker for outputting instructions or a microphone for receiving, comments from a user. FIG. 1 only shows some components conventionally used in mobile devices, and other components may also be provided, for example sensors like an acceleration sensor or an orientation sensor, which are provided in many conventional smartphones or tablet PCs, and may be used to determine the poses of the mobile device when capturing images in some exemplary embodiments.

Figure 2:
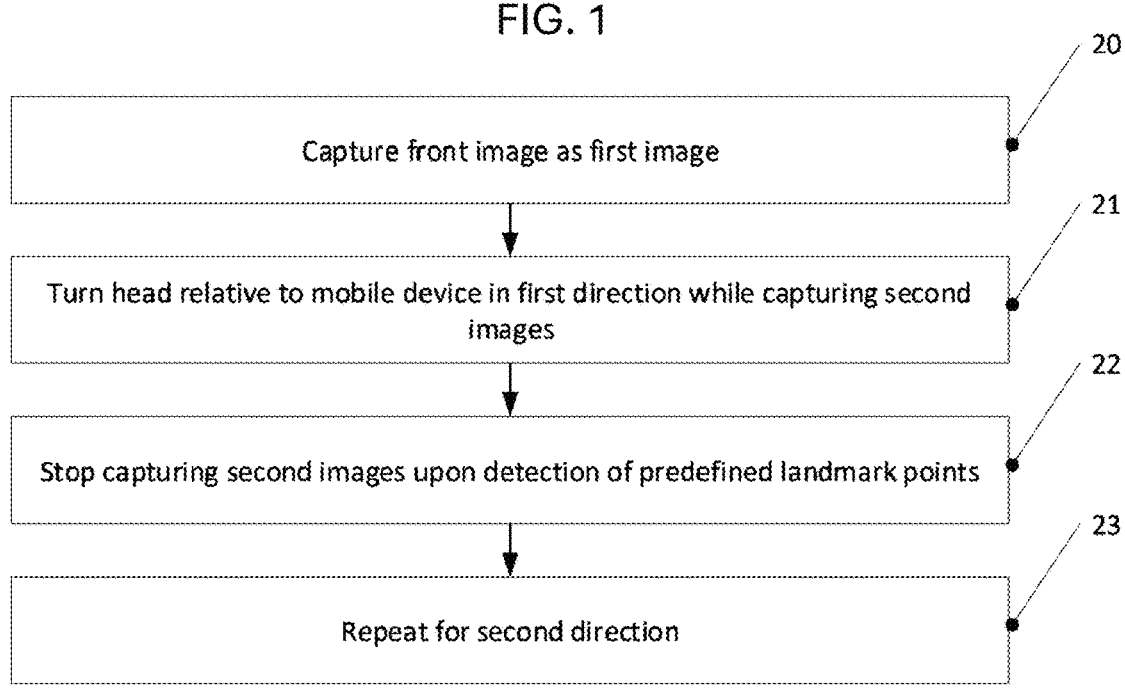
FIG. 2 is a flowchart illustrating a method according to an exemplary embodiment.

For example to generate a head model of a head of a person or an eye portion thereof, or for determining centration parameters, a plurality of images are captured from the head from a plurality of different positions of device 10 relative to the head, in particular by turning the head relative to the mobile device. FIG. 2 is a flowchart illustrating a method according to a corresponding exemplary embodiment. FIGS. 3A to 3C, 4, and 5A to 5C show various diagrams illustrating the method of FIG. 2 further. Generally, for execution of the method of FIG. 2, images of a head are captured, schematically shown as a head 30 in FIG. 3A, by device 10. To capture head 30 from different directions, head 30 is turned relative to device 10, as indicated by an arrow 31 in FIG. 3A. This turning may be made by turning head 30 about a vertical axis, or by moving device 10 around head 30. As also mentioned above, device 10 may output corresponding instructions for the turning.

Figure 3A:
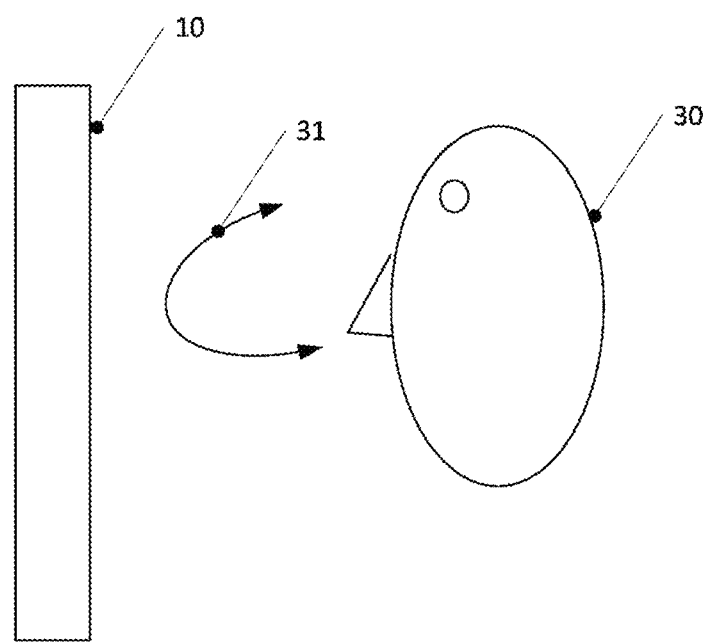
FIGS. 3A to 3C are diagrams illustrating the method of FIG. 2.
Figure 3B:
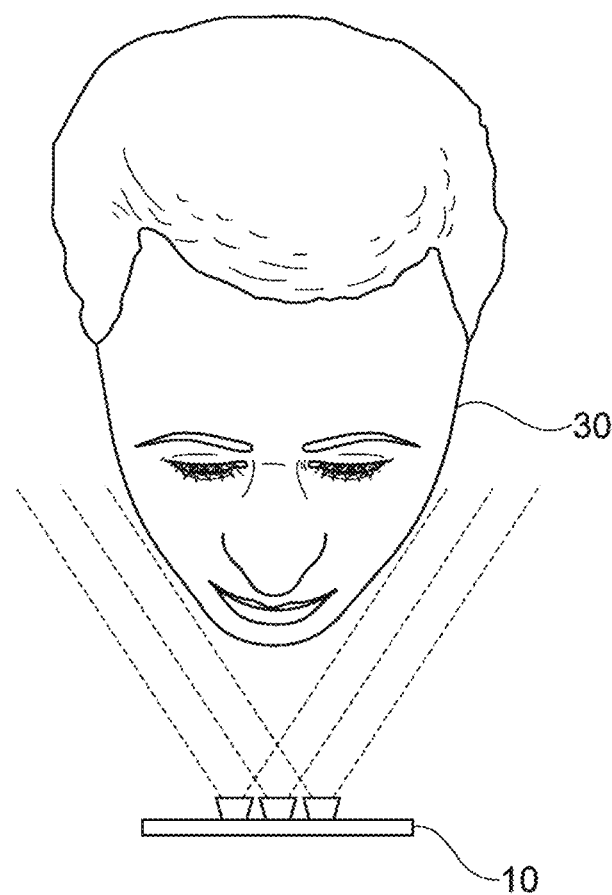

Returning to FIG. 2, at step 20 the method comprises capturing a front image as a first image. This is schematically shown in FIG. 3B, where device 10 captures a front image of head 30, i.e., an image where both eyes are visible, essentially symmetrical to the nose. It should be noted that while in the exemplary embodiment shown the complete head is captured, in other exemplary embodiments, when for a specific purpose only a model of the eyes required, only an eye portion may be captured.

Figure 3C:
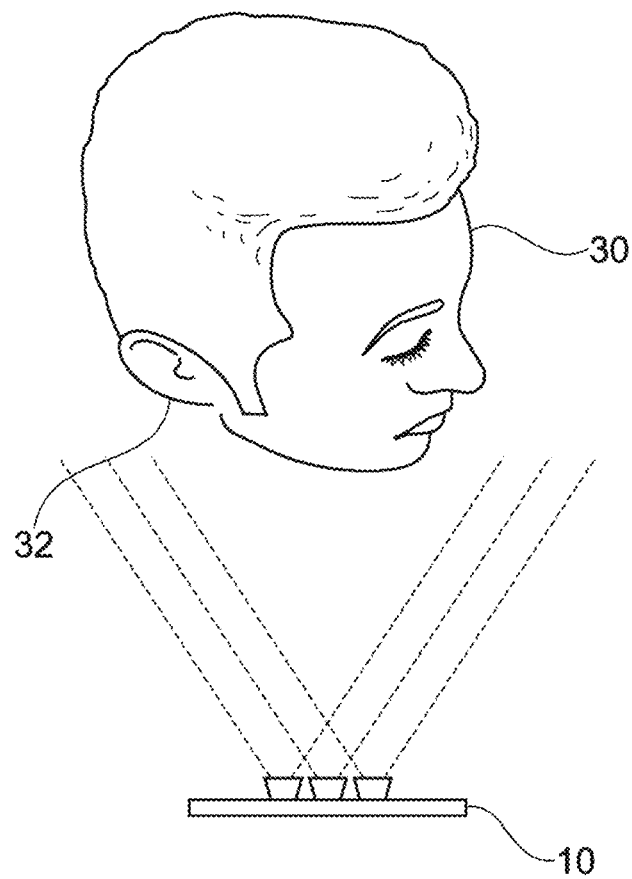

At step 21, the method then comprises turning the head relative to the mobile device in a first direction while capturing second images. This turning may for example be a turning to the left side. FIG. 3C shows the head 30 turned to the left side such that an ear 32 is now visible essentially from the side, while mobile device 10 captures images. As mentioned above, to start the turning, device 10 may output corresponding instructions to the person.

While in steps 20 and 21 device 10 is used for capturing the images, in other exemplary embodiments a camera external to device 10 and linked in a wire-based or wireless manner to device 10 may be used. Moreover, while in step 21 images from different directions are generated by turning the head, in other exemplary embodiments other approaches may be used, like moving device 10 or the external camera with respect to the head.

At step 22, the method comprises stopping capturing the second images upon detection of predefined landmarks in a second image. Together with stopping capturing, a corresponding instruction may be output to a person to stop turning the head in the first direction relative to mobile device 10.

Figure 4:
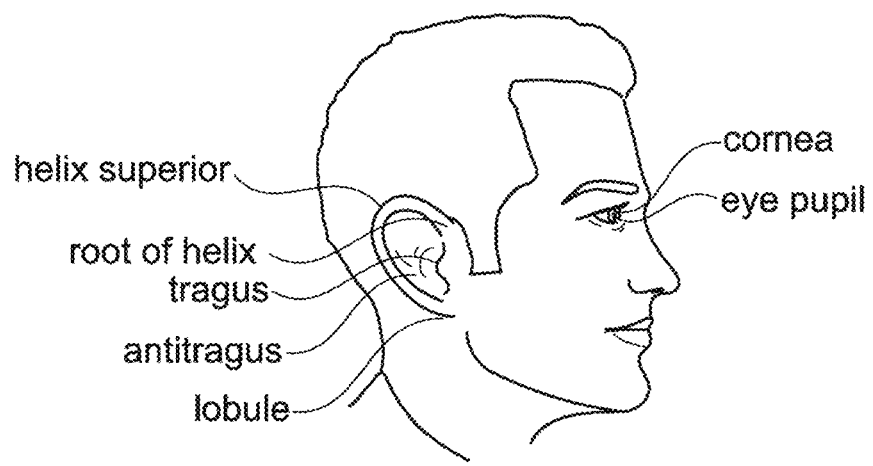
FIG. 4 is a diagram illustrating landmarks on a head of a person.

As explained above, the predefined landmarks may indicate that a side image has been captured with landmarks necessary for later processing visible. Examples of the landmarks are shown in FIG. 4. In this case, the cornea and the eye pupil are landmarks related to the eye, and additionally various landmarks related to the ear, namely the lobule, the antitragus, the tragus, the root of the helix and the highest point of the helix (helix superior) may be used as landmark points. Other ear related landmark points may also be used.

Figure 5:
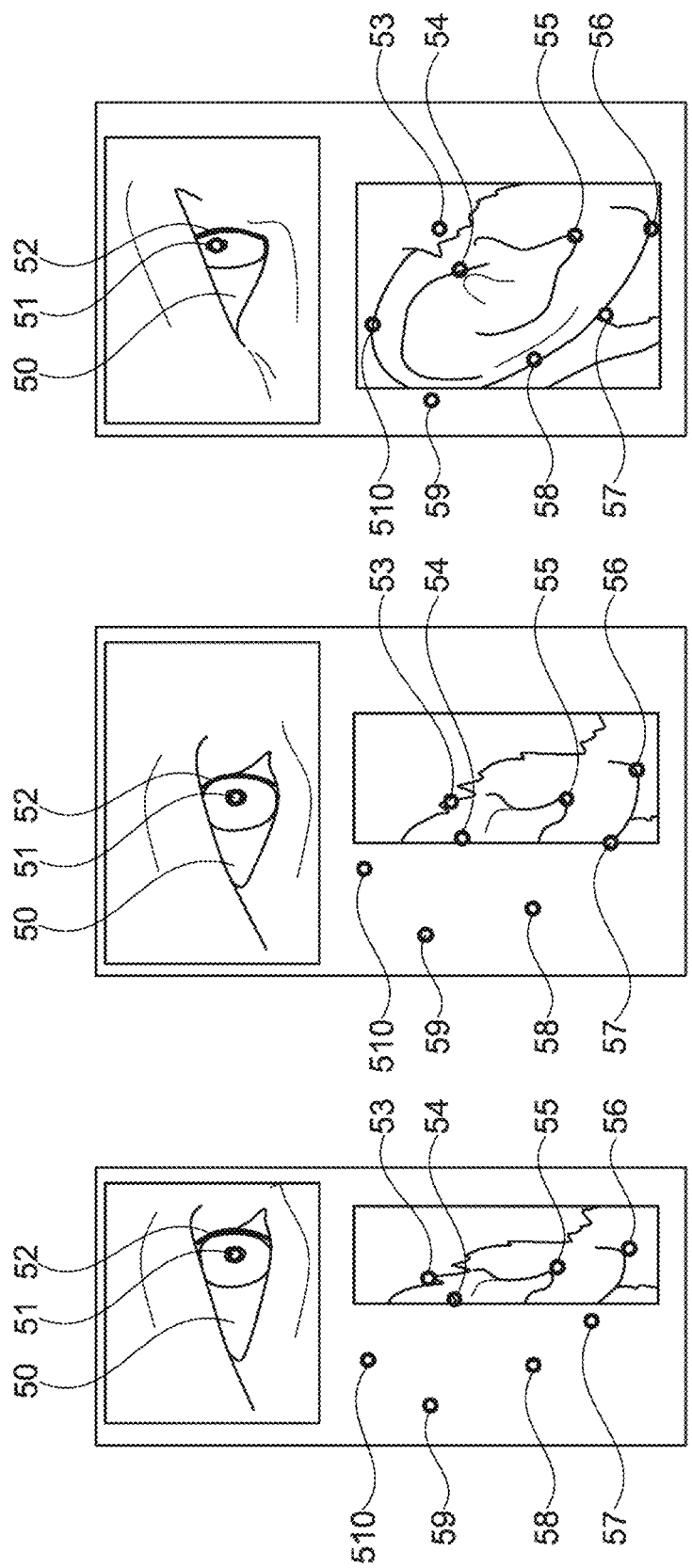
FIGS. 5A to 5C are diagrams illustrating detected landmarks at an eye and an ear for various turning angles of a head of a person.

FIGS. 5A to 5C show an eye region and an ear region of example images when gradually turning the head further relative to the mobile device, i.e., FIG. 5A shows a case with comparatively little turning, in FIG. 5B the head is turned a little more, and FIG. 5C still more. The eye region and ear region are shown separately to avoid the need of showing other regions where no landmarks are determined in this particular exemplary embodiment, but are part of the same image.

For the eye 50, pupil 51 and a curve 52 denoting the cornea (the front contour of the cornea) are detected. For the ears, landmark points 53-510 are detected, where some of the points correspond to points explained with reference to FIG. 4. For example, landmark point 56 denotes the lobule and landmark point 510 denotes the helix superior, the topmost part of the helix. Points in addition to the ones shown e.g., in FIG. 4 may be used or required for a feature detector, as explained above. In FIGS. 5A and 5B, the direction from which the camera captures the face is diagonally from the front. Parts of the ear not shown in FIGS. 5A, 5B, and 5C in this example are outside the field of view of the camera.

In each of FIGS. 5A, 5B, and 5C, the three landmarks of the eye, namely the front contour of the cornea 50, pupil 51, and cornea 52, are visible. However, in FIGS. 5A and 5B only a comparatively small part of the ear is visible and only landmark points 53-56 can be detected, while landmark points 57-510 cannot be detected. In contrast thereto, in FIG. 5C the ear is almost fully visible, and with the exception of landmark point 59 all ear landmark points are visible. Therefore, as a subset of landmark points which has to be identified in step 21 of FIG. 2, landmarks 51, 52, 53-58 and 510 may be taken. As soon as all these landmarks are detected, the method decides that a side view has been sufficiently captured. As can be seen in FIG. 5C, the eye is indeed essentially captured from the side. The second image where these landmarks are visible can also be taken as side view of the head for further processing. It should be noted that when the person wears a real spectacle frame, in some views some eye landmarks may be occluded by the spectacle frame, such that the detection of eye landmarks for stopping the capturing in step 22 ensures that in the image where the landmarks are visible the eye is or at least the relevant eye landmarks are not occluded by these spectacle frame.

Returning to FIG. 2, optionally then the process, i.e., the steps 21 and 22-23, may be repeated for a second direction. For example, when in step 21 the head was turned to the left from the front position, then in step 23 the head may turn to the right starting from the front position, to also capture the left side of the head.

The captured images may then be used for model generation and centration parameter determination. A flowchart illustrating a corresponding method according to an exemplary embodiment is shown in FIG. 6.

Figure 6:
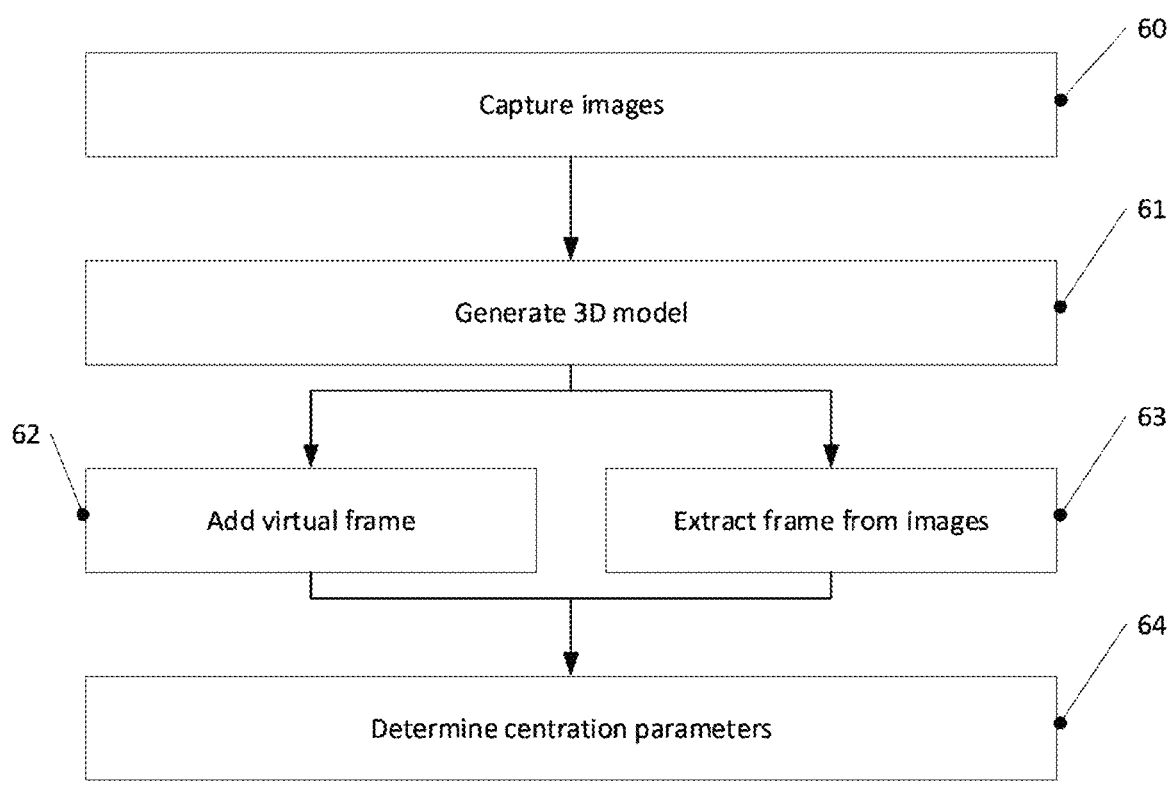
FIG. 6 is a flowchart illustrating a method according to an exemplary embodiment.

In step 60 in FIG. 6, the method comprises capturing images of a head of a person with a mobile device. This image capturing process in step 60 is performed as explained above with reference to FIG. 2. In step 61, the method comprises generating a 3D model of the head based on the images, as already explained above. For a determination of centration parameters, additional information about the position of a spectacle frame relative to the head is needed. FIG. 6 shows two alternatives. In a first alternative, the person does not wear a spectacle frame when the images are captured, or the spectacle frame is removed from the images or the model, as explained above. In this case, in step 62, a virtual frame is added, i.e., a model of a spectacle frame is fitted to the 3D model of the head generated in step 61. Alternatively, when the person wears a real spectacle frame, in step 63 the frame is extracted from the images or from the generated 3D model, and used for determination of centration parameters. In both cases, in step 64, centration parameters are determined. This is performed as explained above in more detail.

Some further exemplary embodiments are defined by the following clauses:

Clause 1. A method for head image capturing, comprising:
capturing, with a mobile device, a first image of at least an eye portion of a head,
turning the head in a first direction relative to the mobile device while capturing a plurality of second images of the head with the mobile device,
characterized by
searching for predefined landmarks in each of the second images, and
stopping capturing the plurality of second images in response to identifying at least a predefined subset of the predefined landmarks in a second image of the plurality of second images.

Clause 2. The method of clause 1, characterized by further comprising outputting instructions to stop moving the head in the first direction relative to the mobile device in response to identifying at least the predefined subset in the second image of the plurality of second images.

Clause 3. The method of clause 1 or 2, characterized by further comprising, after the stopping:

turning the head in a second direction relative to the mobile device opposite the first direction while capturing a plurality of third images of the head with the mobile device, searching for further predefined landmarks in each of the third images, and stopping capturing the third images in response to identifying at least a further predefined subset of the further predefined landmarks in a third image of the plurality of third images.

Clause 4. The method of clause 3, characterized by further comprising outputting instructions to stop turning the head in the second direction relative to the mobile device in response to identifying at least the further predefined subset in the third image of the plurality of third images.

Clause 5. The method of any one of clauses 1 to 4, characterized in that the first image is a front image.

Clause 6. The method of any one of clauses 1 to 5, characterized in that at least one of the group consisting of the predefined subset and the further predefined subset is indicative of a side view of the head.

Clause 7. The method of any one of clauses 1 to 5, characterized in that at least one of the group consisting of the predefined landmarks and the further predefined landmarks include at least one point selected from the group consisting of a pupil, a cornea apex, a cornea outline and a point at an ear.

Clause 8. The method of any one of clauses 1 to 7, characterized by further comprising determining at least one geometrical parameter based on the first and second images.

Clause 9. The method of any one of clauses 1 to 8, characterized by further comprising generating a head model based on the first image and at least one of the plurality of second images, or based on the first image, at least one of the plurality of the second images and at least one of the plurality of the third images.

Clause 10. The method of clause 9, characterized by further comprising virtually fitting a model of a spectacle frame to the head model.

Clause 11. The method of any one of clauses 1 to 9, characterized in that the head wears a spectacle frame, and that the method further comprises identifying the spectacle frame in the first image and at least one of the plurality of the second images.

Clause 12. The method of any one of clauses 10 or 11, characterized by further comprising calculating at least one centration parameter based on at least one of the group consisting of the first image, the second images, the head model, the fitted model of the spectacle frame and the identifying of the spectacle frame.

Clause 13. A method for manufacturing a spectacle lens based on the centration parameter calculated according to the method of clause 12.

Clause 14. A mobile device, characterized by comprising:
a camera for capturing images, and
a processor configured to control the mobile device to:
capture a first image of at least an eye portion of a head,
capture a plurality of second images of the head while the head is turning in a first direction relative to the mobile device,
characterized in that the processor is further configured to control the mobile device to:
search for predefined landmarks in each of the second images, and
stop capturing the second images in response to identifying at least a predefined subset of the predefined landmarks in a second image of the plurality of second images.

Clause 15. A computer program for a mobile device including a camera and a processor, characterized by causing, when executed on the processor, the mobile device for execution of the method of any one of clauses 1 to 12.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A method for head image capturing, comprising:
providing to a mobile device a first image of at least an eye portion of a head; and
providing to the mobile device a plurality of second images of the head from a plurality of directions;
the method further comprising:
searching, by the mobile device, for predefined landmarks in each of the second images, wherein landmarks are specific points or areas on the head; and
stopping providing to the mobile device the plurality of second images in response to identifying, by the mobile device, a predefined subset of the predefined landmarks in a second image of the plurality of second images.

2. The method of claim 1, wherein the providing of the first and second images to the mobile device comprises providing the first and second images captured by a camera of the mobile device.

3. The method of claim 1, wherein providing to the mobile device the plurality of second images of the head from a plurality of direction is providing to the mobile device the plurality of second images while the head is turning in a first direction relative to the mobile device.

4. The method of claim 3, wherein the second direction is opposite the first direction.

5. The method of claim 1, further comprising outputting instructions to start turning the head in a first direction relative to the mobile device after the providing of the first image and prior to the providing of the plurality of second images and/or outputting instructions to stop moving the head in the first direction relative to the mobile device in response to identifying at least the predefined subset in the second image of the plurality of second images.

6. The method of claim 1, further comprising, after the stopping:
providing to the mobile device a plurality of third images of the head from a plurality of further directions;
searching, with the mobile device, for further predefined landmarks in each of the third images; and stopping providing to the mobile device the plurality of third images in response to identifying, with the mobile device, at least a further predefined subset of the further predefined landmarks in a third image of the plurality of third images.

7. The method of claim 6, wherein the providing of the third images to the mobile device comprises providing the third images captured by a camera of the mobile device.

8. The method of claim 6, wherein the plurality of third images are captured while the head is turning in a second direction relative to the mobile device after stopping the providing of the plurality of second images and prior to the providing of the plurality of third images.

9. The method of claim 6, further comprising, by the mobile device, outputting instructions to start turning the head in a second direction relative to the mobile device after stopping the providing of the plurality of second images and prior to the providing of the plurality of third images.

10. The method of claim 9, further comprising outputting instructions to stop turning the head in the second direction relative to the mobile device in response to identifying at least the further predefined subset in the third image of the plurality of third images.

11. The method of claim 6, wherein the searching for the further predefined landmarks utilizes a trained machine learning logic.

12. The method of claim 1, wherein the searching for the predefined landmarks utilizes a trained machine learning logic.

13. The method of claim 1, wherein the first image is a front image.

14. The method of claim 1, wherein at least one of the groups consisting of the predefined subset and the further predefined subset is indicative of a side view of the head.

15. The method of claim 1, wherein at least one of the groups consisting of the predefined landmarks and the further predefined landmarks includes at least one point selected from the group consisting of a pupil, a cornea apex, a cornea outline, and a point at an ear.

16. The method of claim 1, further comprising determining at least one geometrical parameter based on the first and second images.

17. The method of claim 1, further comprising generating a head model based on the first image and at least one of the plurality of second images, or based on the first image, at least one of the plurality of the second images and at least one of the plurality of the third images.

18. The method of claim 17, wherein the generating of the head model is performed by the mobile device.

19. The method of claim 18, further comprising calculating at least one centration parameter based on at least one of the group consisting of the first image, the second images, the head model, the fitted model of the spectacle frame, and the identifying of the spectacle frame.

20. A method for manufacturing a spectacle lens based on the centration parameter calculated according to the method of claim 19.

21. The method of claim 17, further comprising virtually fitting a model of a spectacle frame to the head model.

22. The method of claim 1, wherein the head wears a spectacle frame, and wherein the method further comprises identifying the spectacle frame in the first image and at least one of the plurality of the second images.

23. A computer program for a mobile device comprising a processor, the computer program causing, when executed on the processor, the mobile device to execute the method of claim 1.

24. A mobile device, comprising:
a processor configured to control the mobile device to:
obtain a first image of at least an eye portion of a head,
obtain a plurality of second images of the head from a plurality of directions,
wherein the processor is further configured to control the mobile device to:
search for predefined landmarks in each of the second images, wherein landmarks are specific points or areas on the head, and
stop obtaining the plurality of second images in response to identifying, with the mobile device, a predefined subset of the predefined landmarks in a second image of the plurality of second images.

* * * * *

UNITED STATES PATENT AND TRADEMARK OFFICE
CERTIFICATE OF CORRECTION

PATENT NO. : 12,307,590 B2
APPLICATION NO. : 18/793827
DATED : May 20, 2025
INVENTOR(S) : Oliver Schwarz Page 1 of 1

It is certified that error appears in the above-identified patent and that said Letters Patent is hereby corrected as shown below:

In the Specification

In Column 6, Line 29: change "for calibration 3D reconstruction see camera and example" to -- see for example camera calibration and 3D reconstruction --

In Column 7, Line 66: change "cars" to -- ears --

In Column 11, Line 15: change "cars" to -- ears --

Signed and Sealed this
First Day of July, 2025

Coke Morgan Stewart
*Acting Director of the United States Patent and Trademark Office*